US012680740B2

(12) United States Patent
Jin et al.

(10) Patent No.: US 12,680,740 B2
(45) Date of Patent: Jul. 14, 2026

(54) ELECTRONIC EXPANSION VALVE

(71) Applicant: ZHEJIANG DUNAN ARTIFICIAL ENVIRONMENT CO., LTD., Shaoxing (CN)

(72) Inventors: Ju Jin, Shaoxing (CN); Haijian Sha, Shaoxing (CN); Fugang Wang, Shaoxing (CN)

(73) Assignee: ZHEJIAN DUNAN ARTIFICIAL ENVIRONMENT CO., LTD., Shaoxing (CN)

( * ) Notice: Subject to any disclaimer, the term of this patent is extended or adjusted under 35 U.S.C. 154(b) by 154 days.

(21) Appl. No.: 18/715,027

(22) PCT Filed: Nov. 30, 2022

(86) PCT No.: PCT/CN2022/135695
§ 371 (c)(1),
(2) Date: May 30, 2024

(87) PCT Pub. No.: WO2023/098768
PCT Pub. Date: Jun. 8, 2023

(65) Prior Publication Data
US 2025/0027567 A1     Jan. 23, 2025

(30) Foreign Application Priority Data
Nov. 30, 2021    (CN) .......................... 202123001229.1

(51) Int. Cl.
*F16K 31/04*          (2006.01)
*F16K 1/42*           (2006.01)
(Continued)

(52) U.S. Cl.
CPC ................ *F25B 41/34* (2021.01); *F16K 1/42* (2013.01); *F16K 31/04* (2013.01); *F16K 25/005* (2013.01)

(58) Field of Classification Search
CPC .......... F16K 1/42; F16K 31/04; F16K 25/005; F25B 41/34
See application file for complete search history.

(56) References Cited

U.S. PATENT DOCUMENTS

| | | | |
|---|---|---|---|
| 2,040,727 A | 5/1936 | Ayling | |
| 2,886,283 A * | 5/1959 | Natho ....................... | F16K 1/46 251/363 |

(Continued)

FOREIGN PATENT DOCUMENTS

| | | |
|---|---|---|
| CN | 203111200 U | 8/2013 |
| CN | 104930762 A | 9/2015 |

(Continued)

OTHER PUBLICATIONS

CN-112879574 Translation (Year: 2021).*

(Continued)

*Primary Examiner* — Umashankar Venkatesan
(74) *Attorney, Agent, or Firm* — The Sun IP Law

(57) ABSTRACT

An electronic expansion valve, including: a valve seat, wherein the valve seat is provided with a first mounting channel extending in an axial direction, and a valve port is provided in the first mounting channel; a valve needle, which is movably mounted in the first mounting channel to block or avoid of the valve port, wherein a mounting gap is provided between a wall surface of the first mounting channel and an outer wall of the valve needle; and a first sealing piece, which is mounted on the valve needle, wherein the first sealing piece is located in the mounting gap, so as to seal the mounting gap by means of the first sealing piece. The electronic expansion valve can solve the technical problems in the related art of poor sealing performance of an electronic expansion valve and a valve needle being prone to moving.

12 Claims, 5 Drawing Sheets

(51) Int. Cl.
  *F25B 41/34* (2021.01)
  *F16K 25/00* (2006.01)

(56) References Cited

U.S. PATENT DOCUMENTS

| | | | | |
|---|---|---|---|---|
| 3,362,680 A | | 1/1968 | Weiss | |
| 3,815,873 A | * | 6/1974 | Hendrick | F16K 1/485 |
| | | | | 251/85 |
| 4,377,892 A | | 3/1983 | Gonzalez | |
| 5,052,656 A | | 10/1991 | Katayama | |
| 6,530,528 B2 | * | 3/2003 | Breyer | F25B 41/24 |
| | | | | 236/92 B |
| 8,157,183 B2 | | 4/2012 | Hayashi | |
| 8,556,229 B2 | * | 10/2013 | Lv | F16K 31/047 |
| | | | | 251/264 |
| 8,651,456 B2 | * | 2/2014 | Zhan | F25B 41/34 |
| | | | | 251/83 |
| 9,810,461 B2 | * | 11/2017 | Zhan | F16K 15/18 |
| 10,795,381 B2 | | 10/2020 | Hashimoto | |
| 10,845,105 B2 | | 11/2020 | He | |
| 11,313,475 B2 | | 4/2022 | Lv | |
| 11,473,691 B2 | * | 10/2022 | Dehrmann | F16K 1/36 |
| 12,429,138 B2 | * | 9/2025 | Feng | F16K 31/04 |
| 2008/0087343 A1 | | 4/2008 | Doutt | |
| 2008/0185452 A1 | | 8/2008 | Kobayashi | |
| 2012/0181464 A1 | | 7/2012 | Pfetzer | |
| 2014/0264135 A1 | | 9/2014 | Bell | |
| 2015/0048266 A1 | | 2/2015 | Shen | |
| 2015/0122360 A1 | | 5/2015 | Zhan | |
| 2019/0368618 A1 | | 12/2019 | Wei | |
| 2020/0340596 A1 | | 10/2020 | Lv | |
| 2021/0239378 A1 | | 8/2021 | Chen | |

FOREIGN PATENT DOCUMENTS

| | | | | | |
|---|---|---|---|---|---|
| CN | 204805577 U | 11/2015 | | | |
| CN | 205715985 U | 11/2016 | | | |
| CN | 107304843 A | 10/2017 | | | |
| CN | 206600517 U | 10/2017 | | | |
| CN | 107435753 A | 12/2017 | | | |
| CN | 107642927 A | 1/2018 | | | |
| CN | 206988439 U | 2/2018 | | | |
| CN | 108343749 A | 7/2018 | | | |
| CN | 108626414 A | 10/2018 | | | |
| CN | 108692081 A | 10/2018 | | | |
| CN | 109425150 A | 3/2019 | | | |
| CN | 110529605 A | 12/2019 | | | |
| CN | 210123018 U | 3/2020 | | | |
| CN | 111059295 A | 4/2020 | | | |
| CN | 112032311 A | 12/2020 | | | |
| CN | 112178223 A | 1/2021 | | | |
| CN | 112212016 A | 1/2021 | | | |
| CN | 212480175 A | 2/2021 | | | |
| CN | 112524261 A | 3/2021 | | | |
| CN | 112696499 A | 4/2021 | | | |
| CN | 112879574 A | * | 6/2021 | | F16K 1/42 |
| CN | 114321396 A | 4/2022 | | | |
| CN | 216742868 U | 6/2022 | | | |
| CN | 216742869 U | 6/2022 | | | |
| CN | 216742870 U | 6/2022 | | | |
| CN | 216742871 U | 6/2022 | | | |
| CN | 216742872 U | 6/2022 | | | |
| CN | 114688270 A | 7/2022 | | | |
| DE | 102010018024 A1 | 10/2011 | | | |
| EP | 4206502 A1 | 7/2023 | | | |
| EP | 4273428 A1 | 11/2023 | | | |
| JP | 2007292336 A | 11/2007 | | | |
| JP | 4566714 B2 | 10/2010 | | | |
| JP | 2016200198 A | 12/2016 | | | |
| JP | 2018021626 A | 2/2018 | | | |
| JP | 2021500516 A | 1/2021 | | | |
| JP | 202132295 A | 3/2021 | | | |
| KR | 20200066709 A | 6/2020 | | | |
| WO | 2017169319 A1 | 10/2017 | | | |
| WO | 2020135162 A1 | 7/2020 | | | |
| WO | 2020230382 A1 | 11/2020 | | | |

OTHER PUBLICATIONS

The first office action of counterpart JP application No. 2024525034 issued on Jul. 15, 2025.

The first office action of counterpart JP application No. 2024525731 issued on May 19, 2025.

The second office action of counterpart CN application No. 2021114477105 issued on Sep. 30, 2025.

The first office action of U.S. Appl. No. 18/281,577 issued on Nov. 14, 2024.

The search report of counterpart EP application No. 22770174.5 issue on Jul. 17, 2024.

The first office action of counterpart JP application No. 2023-551112 issue on Aug. 30, 2024.

The first office action of counterpart EP application No. 22900571 was issued on Feb. 5, 2025.

The search report of the international application No. PCT/CN2022/072129 issue on Mar. 21, 2022.

The first office action of counterpart KR application No. 20237035080 was issued on Jan. 20, 2025.

The search report of the international application No. PCT/CN2022/135694 issue on Feb. 27, 2023.

The first office action of counterpart CN application No. 202111447710.5 was issued on Dec. 17, 2024.

The search report of the international application No. PCT/CN2022/135693 issue on Feb. 25, 2023.

The first office action of counterpart U.S. Appl. No. 18/715,046 issued on Mar. 4, 2026.

\* cited by examiner

ELECTRONIC EXPANSION VALVE

CROSS-REFERENCE TO RELATED APPLICATION

The disclosure is a national stage application of International Patent Application No. PCT/CN2022/135695, which is filed on Nov. 30, 2022, and claims priority to Patent Application No. 202123001229.1, filed to the Chinese Patent Office on Nov. 30, 2021 and entitled "Electronic Expansion Valve".

TECHNICAL FIELD

The present disclosure relates to the technical field of electronic expansion valves, and in particular to an electronic expansion valve.

BACKGROUND

At present, an electronic expansion valve in the related art generally includes a valve seat and a valve needle. The valve needle is movably provided in the valve seat, so as to open or close a valve port by means of the valve needle.

However, due to a certain gap between an outer wall of the valve needle and an inner wall of the valve seat, some of the fluid in the valve seat flows out through the gap between the outer wall of the valve needle and the inner wall of the valve seat, resulting in poor sealing performance of the electronic expansion valve. If the gap between the valve needle and the valve seat is too large, the valve needle is prone to moving, and if the gap between the valve needle and the valve seat is too small, the valve needle and the valve seat are prone to being stuck.

SUMMARY

The main purpose of the present disclosure is to provide an electronic expansion valve to solve the technical problems in the related art of poor sealing performance of an electronic expansion valve and a valve needle being prone to moving.

In order to achieve the above purpose, the present disclosure provides an electronic expansion valve, including: a valve seat, a valve needle, and a first sealing piece. The valve seat is provided with a first mounting channel extending in an axial direction, and a valve port is provided in the first mounting channel. The valve needle is movably disposed in the first mounting channel to adjust an opening degree of the valve port, and a mounting gap is provided between a wall surface of the first mounting channel and an outer wall of the valve needle. The first sealing piece is disposed on the valve needle, and the first sealing piece is disposed in the mounting gap, so as to seal the mounting gap by means of the first sealing piece. The first sealing piece and the first mounting channel are of interference fit structures, an interference amount of the first sealing piece is l, and l>0.3 mm.

In some embodiments, the first sealing piece is a sealing ring, and the sealing ring is sleeved on the valve needle.

In some embodiments, the outer wall of the valve needle is provided with a mounting groove, the sealing ring is disposed in the mounting groove, and an outer diameter of the sealing ring is greater than an outer diameter of the valve needle.

In some embodiments, a distance between the wall surface of the first mounting channel and the outer wall of the valve needle is d, and 0<d≤0.08 mm.

In some embodiments, the valve seat is further provided with a communication channel extending in a radial direction, the communication channel communicates with the first mounting channel, and the first sealing piece is disposed on a side, away from the valve port, of the first mounting channel.

In some embodiments, one end of the first mounting channel forms a first mounting port, an other end of the first mounting channel forms a second mounting port, the first mounting port is disposed above the second mounting port, a cross-sectional area of the second mounting port is greater than a cross-sectional area of the first mounting port, a cross-sectional area of the valve needle is greater than the cross-sectional area of the first mounting port, and the cross-sectional area of the valve needle is less than the cross-sectional area of the second mounting port, so that the valve needle is disposed into the first mounting channel through the second mounting port.

In some embodiments, the electronic expansion valve further includes a valve core, which is disposed in the first mounting channel. The valve core is provided with the valve port, an inner wall or an end surface of the valve core forms a sealing surface, and the sealing surface is configured to cooperate with the outer wall surface of the valve needle to form a sealing structure.

In some embodiments, the inner wall of the valve core forms the sealing surface, the valve core is provided with a first end and a second end which are disposed oppositely, the first end is provided on a side, close to the valve needle, of the second end, and a circulation area of the sealing surface is gradually reduced in an extending direction from the first end to the second end.

In some embodiments, the electronic expansion valve further includes a valve core sleeve. At least part of the valve core sleeve is disposed in the first mounting channel, the valve core sleeve is disposed at one end, away from the valve needle, of the valve core, and an end of the valve core sleeve abuts against an end of the valve core.

In some embodiments, a balance channel is provided in the valve needle, and the balance channel includes a first section close to the valve port and a second section away from the valve port, where an inner diameter of the first section is greater than an inner diameter of the second section.

By applying the technical solution of the present disclosure, the first sealing piece is disposed between the valve needle and the valve seat with an appropriate interference amount, which not only meets the sealing requirement to prevent movement, but also enables the valve needle to move smoothly in the axial direction to open and close the valve port.

BRIEF DESCRIPTION OF THE DRAWINGS

The drawings of the specification, which constitute a part of the present disclosure, are intended to provide a further understanding of the present disclosure, and the exemplary embodiments of the present disclosure and the description thereof are intended to explain the present disclosure and do not constitute an undue limitation on the present disclosure. In the drawings.

Herein, the above drawings include the following reference signs.

10. Valve seat; 11. Mounting groove; 12. First annular protrusion; 20. Valve needle; 21. Balance channel; 30. Valve core; 31. Sealing surface; 41. First sealing piece; 42. Second sealing piece; 43. Third sealing piece; 50. Spring sleeve; 60. Spring; 70. Screw; 80. Bearing; 90. Valve core sleeve; 91. Main body part; 92. Positioning part; 93. Bottom surface of the valve core; 100. Mounting base body; 101. First mounting channel; 102. Second mounting channel; 103. Second annular protrusion; 104. Annular groove; 105. First opening; 106. Second opening; 110. Connecting sleeve; 120. Sleeve; 130. Nut sleeve; 140. Guide sleeve.

DETAILED DESCRIPTION OF THE EMBODIMENTS

It is to be noted that the embodiments in the present disclosure and features in the embodiments may be combined with each other without conflict. The present disclosure is described in detail below with reference to the drawings and in conjunction with the embodiments.

Figure 1:
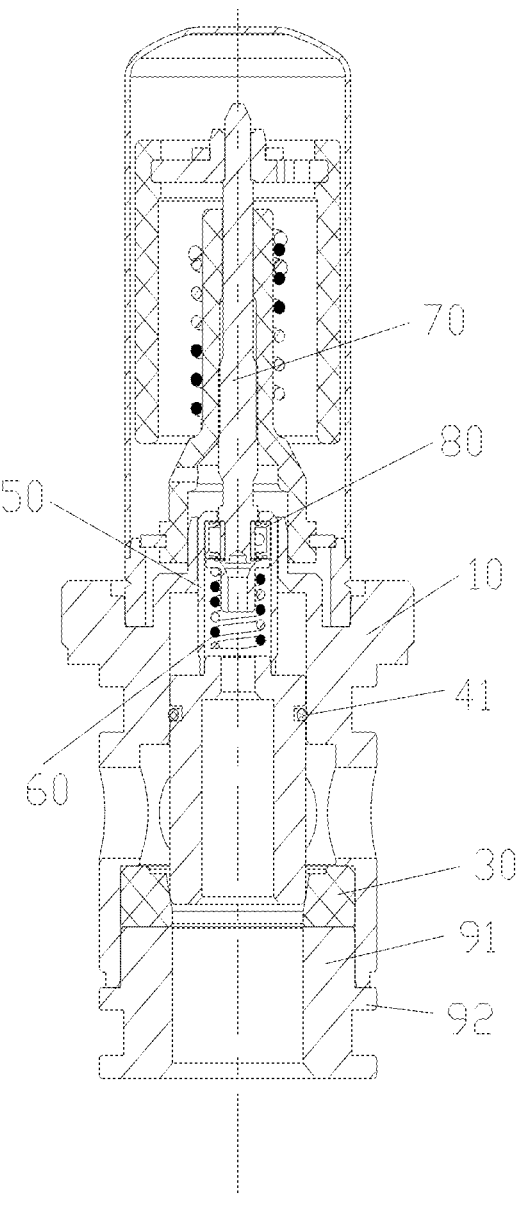
FIG. 1 illustrates a schematic structural diagram of a local structure of an electric valve according to an embodiment of the present disclosure.
Figure 2:
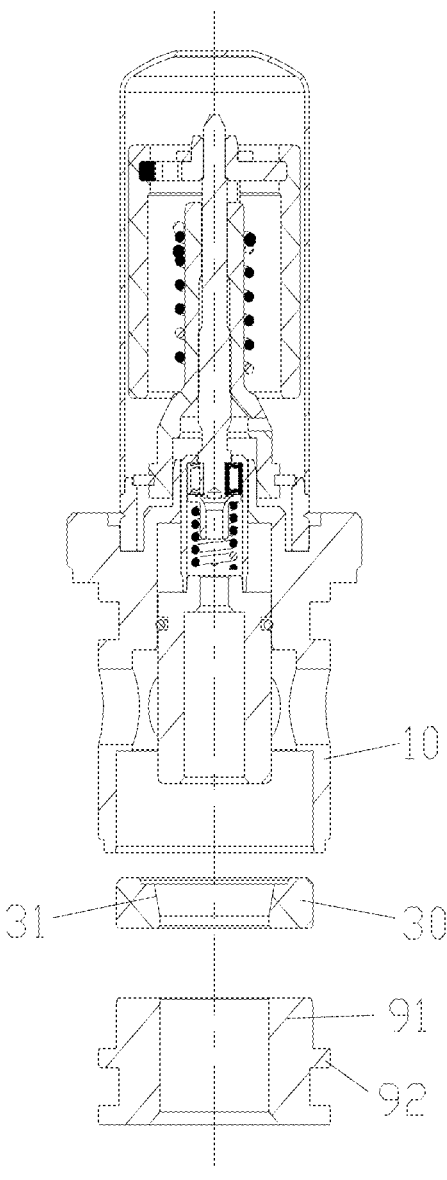
FIG. 2 illustrates an exploded view of a local structure in FIG. 1.
Figure 3:
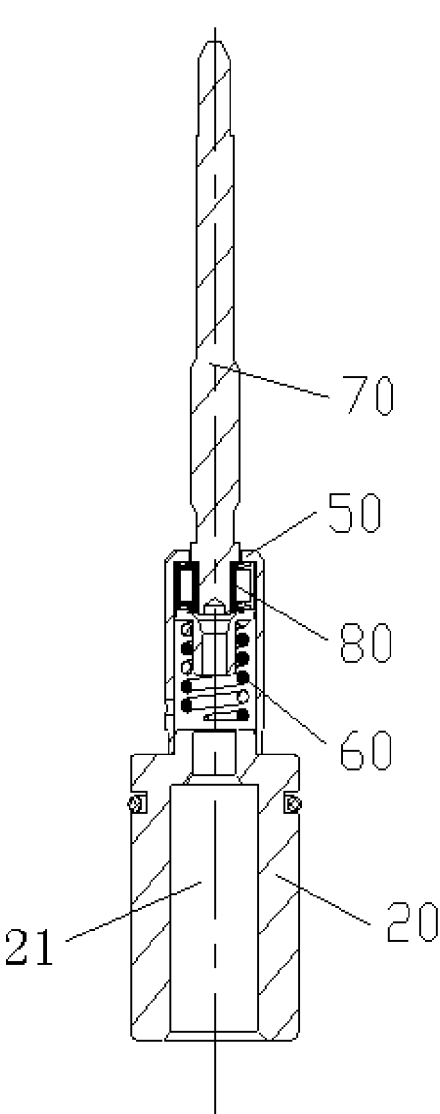
FIG. 3 illustrates a schematic diagram of a mounting structure of a screw, a bearing, and a spring sleeve according to an embodiment of the present disclosure.
Figure 4:
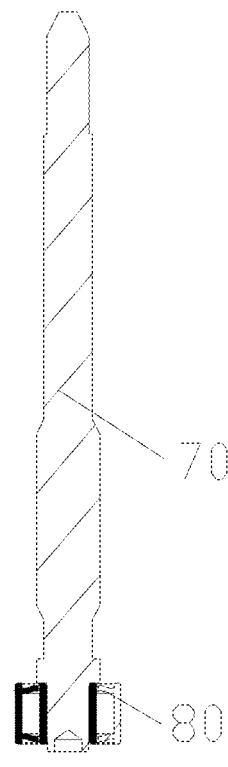
FIG. 4 illustrates a schematic structural diagram of a bearing sleeved on a screw according to an embodiment of the present disclosure.
Figure 5:
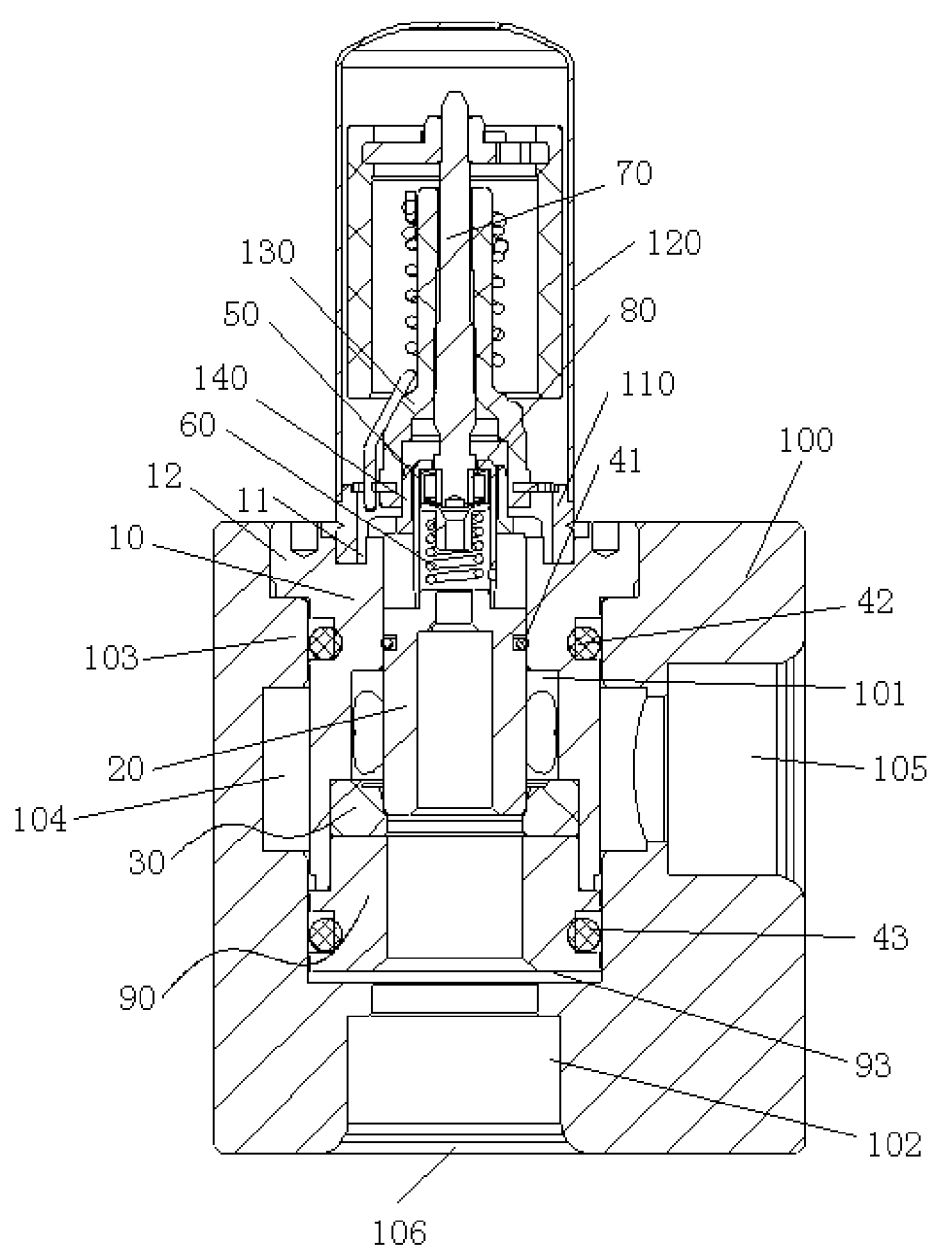
FIG. 5 illustrates a schematic structural diagram of a structure in FIG. 1 mounted on a mounting base body.

As shown in FIG. 1 to FIG. 5, some embodiments of the present disclosure provide an electronic expansion valve, including: a valve seat 10, a valve needle 20, and a first sealing piece 42. The valve seat 10 is provided with a first mounting channel 101 extending in an axial direction, and a valve port is provided in the first mounting channel 101. The valve needle 20 is movably disposed in the first mounting channel 101 to block or avoid of the valve port, thereby adjusting an opening of the valve port. A mounting gap is provided between a wall surface of the first mounting channel 101 and an outer wall of the valve needle 20. The first sealing piece 41 is disposed on the valve needle 20, and the first sealing piece 41 is disposed in the mounting gap, so as to seal the mounting gap by means of the first sealing piece 41. The first sealing piece 41 and the first mounting channel 101 are of interference fit structures, an interference amount of the first sealing piece 41 is l, and l>0.3 mm.

By using the electronic expansion valve provided in the embodiments, the first sealing piece 41 is disposed on the valve needle 20, and the first sealing piece 41 is disposed in the mounting gap between the wall surface of the first mounting channel 101 and the outer wall of the valve needle 20, so that the first sealing piece 41 facilitates effective sealing of the mounting gap, the situation that the fluid flows out of the mounting gap during operation of the electronic expansion valve is avoided, the sealing performance of the electronic expansion valve is effectively ensured, and the sealing effect is improved. Also, l>0.3 mm, which can effectively prevent the valve needle 20 from moving. The interference amount of the first sealing piece 41 in some embodiments is less than that of a conventional sealing piece, so as to ensure that the valve needle 20 can move smoothly in the first mounting channel 101, thereby preventing the valve needle 20 from moving. Therefore, the technical solution provided in the present disclosure can solve the technical problem in the related art of poor sealing performance of an electronic expansion valve.

In addition, the sealing piece is provided in the mounting gap, which can effectively reduce the movement of the valve needle 20, and then reduce the generation of noise.

In some embodiments, the first sealing piece 41 in some embodiments is a sealing ring, and the sealing ring is sleeved on the valve needle 20. With such a structural arrangement, the structure is simple, which facilitates effective sealing, and the sealing effect is effectively ensured.

The outer wall of the valve needle 20 in the embodiment is provided with a mounting groove, the sealing ring is disposed in the mounting groove, and an outer diameter of the sealing ring is greater than an outer diameter of the valve needle 20. With such a structural arrangement, the sealing ring can be in interference fit with the first mounting channel 101, which not only ensures the sealing performance, but also prevents the valve needle 20 from moving.

In some embodiments, a distance between the wall surface of the first mounting channel 101 and the outer wall of the valve needle 20 is d, and 0<d≤0.08 mm. With such a structural arrangement, the valve needle 20 is not prone to being stuck when moving in the axial direction, and a certain guiding space is also provided for the sealing of the valve port.

In some embodiments, the valve seat 10 is further provided with a communication channel extending in a radial direction, the communication channel communicates with the first mounting channel 101, and the first sealing piece 41 is disposed on a side, away from the valve port, of the first mounting channel 101. With such a structural arrangement, effective sealing can be facilitated, and the sealing performance is improved.

In some embodiments, one end of the first mounting channel 101 in the embodiment forms a first mounting port, an other end of the first mounting channel 101 forms a second mounting port, the first mounting port is disposed above the second mounting port, a cross-sectional area of the second mounting port is greater than a cross-sectional area of the first mounting port, a cross-sectional area of the valve needle 20 is greater than that of the first mounting port, and the cross-sectional area of the valve needle 20 is less than that of the second mounting port, so that the valve needle 20 is disposed into the first mounting channel 101 through the second mounting port. With such a structural arrangement, during mounting, the valve needle 20 is mounted from the second mounting port, which facilitates mounting and operation.

In some embodiments, the electronic expansion valve further includes a valve core 30. The valve core 30 is mounted in the first mounting channel 101, the valve core 30 is provided with the valve port, an inner wall or an end surface (the end surface here indicates an upper end surface, or a lower end surface, or the upper end surface and the lower end surface) of the valve core 30 forms a sealing surface 31, and the sealing surface 31 is configured to cooperate with the outer wall surface of the valve needle 20 to form a sealing structure. With such a structural arrangement, effective sealing at the valve port can be facilitated, and the sealing performance is improved.

In some embodiments, the inner wall of the valve core 30 forms the sealing surface 31, the valve core 30 is provided with a first end and a second end which are disposed oppositely, the first end is provided on a side, close to the valve needle 20, of the second end, and a circulation area of the sealing surface 31 is gradually reduced in an extending direction from the first end to the second end. With such a structural arrangement, the sealing performance between the valve needle 20 and the valve core 30 can be improved conveniently, and the leakage condition between the valve core 30 and the valve needle 20 can be reduced.

In some embodiments, the valve core 30 is of a tubular structure, and the shape of the valve core 30 is adapted to the shape of the second mounting port, so that the valve core 30 is mounted into the first mounting channel 101 through the second mounting port. With such a structural arrangement, during mounting, the valve needle 20 is mounted from the second mounting port, and then the valve core 30 is mounted from the second mounting port. The valve core 30 can also be set to a large-caliber structure, and then the valve port can also be of large caliber, thereby facilitating large-flow circulation.

In some embodiments, the electronic expansion valve further includes a valve core sleeve 90. At least part of the valve core sleeve 90 is disposed in the first mounting channel 101, the valve core sleeve 90 is disposed at one end, away from the valve needle 20, of the valve core 30, and an end of the valve core sleeve 90 abuts against an end of the valve core 30. With such a structural arrangement, the valve core 30 can be effectively positioned by means of providing the valve core sleeve 90, thereby improving the arrangement stability of the valve core 30. In addition, the structure of the integrated valve seat 10 is also conveniently changed into a split structure, so as to facilitate mounting and operation.

In some embodiments, a balance channel 21 is provided in the valve needle 20 to balance the pressure at both ends of the valve needle 20. In some embodiments, the balance channel 21 includes a first section close to the valve port and a second section away from the valve port, where an inner diameter of the first section is greater than that of the second section. With such a structural arrangement, the balance channel 21 can be conveniently matched with different calibers.

The valve seat 10 in some embodiments can be of a ring structure, and the electronic expansion valve further includes a spring sleeve 50, a spring 60, a screw 70, and a bearing 80. One end of the spring sleeve 50 is sleeved at the end of the valve needle 20, the spring 60 is mounted in the spring sleeve 50, and the screw 70 is disposed at the other end of the spring sleeve 50. The bearing 80 is sleeved on the screw 70, and the bearing 80 is disposed between the screw 70 and the spring sleeve 50. With such a structural arrangement, due to the fact that the bearing 80 is disposed between the screw 70 and the spring sleeve 50, a soft sealing structure (the soft sealing structure can be formed conveniently by means of enabling the valve core 30 to be made of a plastic material) can be used between the valve core 30 and the valve needle 20, so that the friction between the valve core 30 and the valve needle 20 is smaller than the friction between the valve needle 20 and the valve seat 10, thereby avoiding the problem of abrasion of a soft sealing valve port.

In some embodiments, the electronic expansion valve in some embodiments further includes a drive assembly. The drive assembly is configured to drive the valve needle 20 to move in the axial direction to open or close the valve port. The drive assembly includes a rotor assembly and a nut assembly. The rotor assembly is sleeved on an outer side of the nut assembly, one end, away from the valve needle 20, of the screw 70 is fixedly connected with the rotor assembly, and the rotor assembly drives the valve needle 20 to move in the axial direction through the screw 70, so as to adjust the opening degree of the valve port. An internal thread is provided in the nut assembly and is in threaded connection with the valve needle 20, and the nut assembly is fixedly connected with the valve seat 10 through a connecting piece.

In some embodiments, the valve core sleeve 90 in some embodiments includes a main body part 91 and a positioning part 92. At least part of the main body part 91 is inserted into the second mounting port, and an end of the main body part 91 abuts against an end of the valve core 30. The positioning part 92 protrudes from an outer wall of the main body part 91, and the positioning part 92 is configured for abutting and positioning with an end of the valve seat 10. With such a structural arrangement, a positioning operation on the valve core 30 can be better facilitated, and the arrangement stability of the valve core 30 can be improved.

In some embodiments, the main body part 91 and the positioning part 92 are integrally formed to facilitate production and manufacturing.

In some embodiments, the positioning part 92 is connected with the end of the valve seat 10 by welding, so as to further improve the positioning stability of the valve core 30 and improve the arrangement stability of the valve core sleeve 90.

In some embodiments, the electric valve further includes a mounting base body 100. The mounting base body 100 is provided with a second mounting channel 102, and the valve seat 10, the valve core 30, and the valve core sleeve 90 are all mounted in the second mounting channel 102. A second sealing piece 42 can be disposed between the mounting base body 100 and the valve seat 10. Or, a third sealing piece 43 can be disposed between the mounting base body 100 and the valve core sleeve 90. Or, the second sealing piece 42 can be provided between the mounting base body 100 and the valve seat 10, and the third sealing piece 43 can be provided between the mounting base body 100 and the valve core sleeve 90.

In some embodiments, the second sealing piece 42 is provided between the mounting base body 100 and the valve seat 10, and the third sealing piece 43 is provided between the mounting base body 100 and the valve core sleeve 90. With such a structural arrangement, the sealing performance of the electric valve can be better improved.

In some embodiments, the mounting base body 100 is a valve body or a mounting table, and the mounting condition can be determined according to actual use.

In some embodiments, the electronic expansion valve further includes a connecting sleeve 110, a sleeve 120, a screw 70, and a nut sleeve 130. The connecting sleeve 110 and the valve seat 10 are separately provided and connected, the sleeve 120 is connected with the connecting sleeve 110, the nut sleeve 130 is disposed in a space enclosed by the sleeve 120 and the connecting sleeve 110 and is connected with the connecting sleeve 110, and the screw 70 is connected with the nut sleeve 130.

A mounting groove 11 is provided at a top of the valve seat 10, and an end, away from the sleeve 120, of the connecting sleeve 110 is disposed in the mounting groove 11.

The valve seat 10 includes a guide sleeve 140 and the electronic expansion valve further includes a spring sleeve 50. At least part of the guide sleeve 140 extends into the nut sleeve 130, and the guide sleeve 140 is sleeved outside the spring sleeve 50.

A first annular protrusion 12 is provided at a top of the valve seat 10; the electronic expansion valve further includes a mounting base body 100. An inner wall of the mounting base body 100 is provided with a second annular protrusion 103, and the first annular protrusion 12 is in limiting fit with the second annular protrusion 103. The electronic expansion valve further includes a second sealing piece 42. The second sealing piece 42 is disposed between the valve seat 10 and the second annular protrusion 103; and a bottom surface of the valve core sleeve 93 is spaced apart from at least part of the inner wall of the mounting base body 100.

In some embodiments, the electronic expansion valve further includes a mounting base body 100. A second mounting channel 102 is further provided in the mounting base body 100, the valve seat 10 is disposed in the second mounting channel 102, the mounting base body 100 is further provided with an annular groove 104 communicating with the second mounting channel 102, and an outer wall of the mounting base body 100 is provided with a first opening 105 communicating with the annular groove 104 and a second opening communicating 106 with the second mounting channel 102.

From the above description, it can be seen that the above embodiments of the present disclosure achieve the following technical effects: the sealing performance is improved, and the valve needle 20 is prevented from moving.

It is to be noted that terms used herein are only for the purpose of describing the specific implementations and not intended to limit exemplary implementations of the present disclosure. For example, singular forms, used herein, are also intended to include plural forms, unless otherwise clearly pointed out. In addition, it is also to be understood that terms "contain" and/or "include" used in the specification refer/refers to existence of features, steps, operations, apparatuses, components and/or combinations thereof.

Unless otherwise specified, relative arrangements of components and steps elaborated in these embodiments, numeric expressions and numeric values do not limit the scope of the present disclosure. Furthermore, it is to be understood that for ease of descriptions, the size of each part shown in the drawings is not drawn in accordance with an actual proportional relation. Technologies, methods and devices known by those of ordinary skill in the art may not be discussed in detail. However, where appropriate, the technologies, the methods and the devices shall be regarded as part of the authorized description. In all examples shown and discussed herein, any specific value should be interpreted as only exemplar values instead of limited values. As a result, other examples of the exemplary embodiments may have different values. It is to be noted that similar marks and letters represent similar items in the following drawings. As a result, once a certain item is defined in one drawing, it is unnecessary to further discus the certain item in the subsequent drawings.

In the description of the present disclosure, it is to be understood that the orientations or positional relationships indicated by the orientation words "front, rear, upper, down, left and right", "transverse, longitudinal, vertical and horizontal", "top and bottom", etc. are based on the orientations or positional relationships shown in the drawings, and are only for the convenience of describing the present disclosure and simplifying the description. Unless stated to the contrary, these orientation words do not indicate or imply that the apparatus or element referred to must have a specific orientation, be constructed and operated in a specific orientation, and therefore cannot be construed as limiting the scope of protection of the present disclosure. The orientation words "inside and outside" refer to inside and outside relative to the outline of each part itself.

For ease of description, spatially relative terms such as "over", "above", "on an upper surface" and "upper" may be used herein for describing a spatial position relation between a device or feature and other devices or features shown in the drawings. It should be understood that the spatially relative terms are intended to contain different orientations of the device in usage or operation besides the orientations of the devices described in the drawings. For example, if the devices in the drawings are inverted, those described as "above other devices or structures" or "over other devices or structures" will then be positioned as "below other devices or structures" or "under other devices or structures". Thus, the exemplary term "above" may include both "above" and "below" orientations. The device may also be positioned in various other ways (rotated 90 degrees or at other orientations) and the spatially relative descriptions used herein are interpreted accordingly.

Furthermore, it is to be noted that the use of the words "first", "second" and the like to define parts is only for the convenience of distinguishing the corresponding parts, unless otherwise stated, the words have no special meaning, and therefore cannot be construed as limiting the scope of protection of the present disclosure.

The above are only the preferred embodiments of the present disclosure, and are not intended to limit the present disclosure, and for those of ordinary skill in the art, various modifications and changes can be made to the present disclosure. Any modifications, equivalent substitutions, improvements, etc. within the spirit and scope of the present disclosure shall be included in the scope of protection of the present disclosure.

What is claimed is:

1. An electronic expansion valve, comprising:
   a valve seat, wherein the valve seat is provided with a first mounting channel extending in an axial direction, and a valve port is provided in the first mounting channel;
   a valve needle, which is movably disposed in the first mounting channel to adjust an opening degree of the valve port, wherein a mounting gap is provided between a wall surface of the first mounting channel and an outer wall of the valve needle; and
   a first sealing piece, which is disposed on the valve needle, wherein the first sealing piece is disposed in the mounting gap, so as to seal the mounting gap by means of the first sealing piece;
   wherein the first sealing piece and the first mounting channel are of interference fit structures, an interference amount of the first sealing piece is l, and l>0.3 mm;
   wherein one end of the first mounting channel forms a first mounting port, an other end of the first mounting channel forms a second mounting port, the first mounting port is disposed above the second mounting port, a cross-sectional area of the second mounting port is greater than a cross-sectional area of the first mounting port, a cross-sectional area of the valve needle is greater than the cross-sectional area of the first mounting port, and the cross-sectional area of the valve needle is less than the cross-sectional area of the second mounting port, so that the valve needle is disposed into the first mounting channel through the second mounting port.

2. The electronic expansion valve as claimed in claim 1, wherein the first sealing piece is a sealing ring, and the sealing ring is sleeved on the valve needle.

3. The electronic expansion valve as claimed in claim 2, wherein the outer wall of the valve needle is provided with a mounting groove, the sealing ring is disposed in the mounting groove, and an outer diameter of the sealing ring is greater than an outer diameter of the valve needle.

4. The electronic expansion valve as claimed in claim 1, wherein a distance between the wall surface of the first mounting channel and the outer wall of the valve needle is d, and 0<d≤0.08 mm.

5. The electronic expansion valve as claimed in claim 1, wherein the valve seat is further provided with a communication channel extending in a radial direction, the communication channel communicates with the first mounting channel, and the first sealing piece is disposed on a side, away from the valve port, of the first mounting channel.

6. The electronic expansion valve as claimed in claim 1, further comprising:

a valve core, which is disposed in the first mounting channel, wherein the valve core is provided with the valve port, an inner wall or an end surface of the valve core forms a sealing surface, and the sealing surface is configured to cooperate with the outer wall of the valve needle to form a sealing structure.

7. The electronic expansion valve as claimed in claim 6, wherein the inner wall of the valve core forms the sealing surface, the valve core is provided with a first end and a second end which are disposed oppositely, the first end is provided on a side, close to the valve needle, of the second end, and a circulation area of the sealing surface is gradually reduced in an extending direction from the first end to the second end.

8. The electronic expansion valve as claimed in claim 6, further comprising:

a valve core sleeve, wherein at least part of the valve core sleeve is disposed in the first mounting channel, the valve core sleeve is disposed at one end, away from the valve needle, of the valve core, and an end of the valve core sleeve abuts against an end of the valve core.

9. The electronic expansion valve as claimed in claim 1, wherein a balance channel is provided in the valve needle, the balance channel comprises a first section close to the valve port and a second section away from the valve port, wherein an inner diameter of the first section is greater than an inner diameter of the second section.

10. The electronic expansion valve as claimed in claim 8, wherein a first annular protrusion is provided at a top of the valve seat; the electronic expansion valve further comprises a mounting base body, wherein an inner wall of the mounting base body is provided with a second annular protrusion, and the first annular protrusion is in limiting fit with the second annular protrusion; the electronic expansion valve further comprises a second sealing piece, wherein the second sealing piece is disposed between the valve seat and the second annular protrusion; and a bottom surface of the valve core sleeve is spaced apart from at least part of the inner wall of the mounting base body.

11. The electronic expansion valve as claimed in claim 1, further comprising a mounting base body, wherein a second mounting channel is further provided in the mounting base body, the valve seat is disposed in the second mounting channel, the mounting base body is further provided with an annular groove communicating with the second mounting channel, and an outer wall of the mounting base body is provided with a first opening communicating with the annular groove and a second opening communicating with the second mounting channel.

12. An electronic expansion valve, comprising:

a valve seat, wherein the valve seat is provided with a first mounting channel extending in an axial direction, and a valve port is provided in the first mounting channel;

a valve needle, which is movably disposed in the first mounting channel to adjust an opening degree of the valve port, wherein a mounting gap is provided between a wall surface of the first mounting channel and an outer wall of the valve needle; and a first sealing piece, which is disposed on the valve needle, wherein the first sealing piece is disposed in the mounting gap, so as to seal the mounting gap by means of the first sealing piece;

wherein the first sealing piece and the first mounting channel are of interference fit structures, n interference amount of the first sealing piece is 1, and l>0.3 mm;

wherein a balance channel is provided in the valve needle, the balance channel comprises a first section close to the valve port and a second section away from the valve port, wherein an inner diameter of the first section is greater than an inner diameter of the second section.

* * * * *